United States Patent
Wakabayashi

(10) Patent No.: US 9,543,663 B2
(45) Date of Patent: Jan. 10, 2017

(54) TERMINAL STRUCTURE OF COAXIAL CABLE, AND CONNECTION STRUCTURE OF TERMINAL OF THIS COAXIAL CABLE

(71) Applicant: OLYMPUS CORPORATION, Tokyo (JP)

(72) Inventor: Toru Wakabayashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 13/886,367

(22) Filed: May 3, 2013

(65) Prior Publication Data

US 2013/0240266 A1    Sep. 19, 2013

Related U.S. Application Data

(63) Continuation of application No. PCT/JP2011/071130, filed on Sep. 15, 2011.

(30) Foreign Application Priority Data

Dec. 2, 2010 (JP) .................................. 2010-269303

(51) Int. Cl.
  *H01R 4/02* (2006.01)
  *H02G 15/02* (2006.01)
  *H02G 1/12* (2006.01)

(52) U.S. Cl.
  CPC ............ *H01R 4/023* (2013.01); *H02G 15/025* (2013.01); *H02G 1/128* (2013.01); *H02G 1/1297* (2013.01)

(58) Field of Classification Search
  CPC ...... H01R 4/023; H02G 15/025; H02G 1/128; H02G 1/1297

USPC .......................................................... 174/79
See application file for complete search history.

(56) References Cited

FOREIGN PATENT DOCUMENTS

| JP | 2003-045244 A | | 2/2003 |
|----|---------------|---|--------|
| JP | 2006-185741 A | | 7/2006 |
| JP | 2006185741 A | * | 7/2006 |
| JP | 2008-210563 A | | 9/2008 |
| JP | 2008-257936 A | | 10/2008 |
| JP | 2009-16204 A | | 1/2009 |
| JP | 2009016204 A | * | 1/2009 |
| JP | 2010-226791 A | | 10/2010 |

(Continued)

OTHER PUBLICATIONS

International Search Report dated Nov. 29, 2011 issued in PCT/JP2011/071130 together with an English language translation.

(Continued)

*Primary Examiner* — Timothy Thompson
*Assistant Examiner* — Roshn Varghese
(74) *Attorney, Agent, or Firm* — Scully, Scott, Murphy & Presser, PC

(57) ABSTRACT

A terminal structure include an internal conductor connection portion, a removal portion and an external conductor connection portion. The internal conductor connection portion is connected to a internal conductor via a conducting portion and an external conductor. The removal portion is provided at a rear side relative to the internal conductor connection portion. The external conductor connection portion is provided at a rear side relative to the removal portion, is formed in the outer peripheral surface of the external conductor, is shut off from the internal conductor connection portion by the removal portion, and is connected to the external conductor.

10 Claims, 6 Drawing Sheets

(56) References Cited

FOREIGN PATENT DOCUMENTS

JP        2010226791 A  *  10/2010
WO    2006/017380 A1    2/2006

OTHER PUBLICATIONS

International Preliminary Report on Patentability together with the Written Opinion dated Jun. 13, 2013 received in related International Application No. PCT/JP2011/071130.
Extended Supplementary European Search Report dated Apr. 8, 2014 from related European Application No. 11 84 4019.7.
Japanese Office Action dated Jun. 30, 2015 from related Japanese Patent Application No. 2010-269303, together with an English language translation.
European Patent Convention Communication dated Apr. 14, 2015, from corresponding European Application No. 11 844 019.7.
Chinese Office Action dated Jun. 2, 2015 from related Chinese Application No. 201180056671.4, together with an English language translation.
European Patent Communication dated Dec. 16, 2015 from corresponding European Application No. 11 844 019.7.
Chinese Office Action dated Mar. 28, 2016 in related Chinese Patent Application No. 201180056671.4.

* cited by examiner

US 9,543,663 B2

TERMINAL STRUCTURE OF COAXIAL CABLE, AND CONNECTION STRUCTURE OF TERMINAL OF THIS COAXIAL CABLE

CROSS REFERENCE TO RELATED APPLICATIONS

This application is a Continuation application of PCT Application No. PCT/JP2011/071130, filed Sep. 15, 2011 and based upon and claiming the benefit of priority from prior Japanese Patent Application No. 2010-269303, filed Dec. 2, 2010, the entire contents of all of which are incorporated herein by reference.

BACKGROUND OF THE INVENTION

1. Field of the Invention

The present invention relates to a terminal structure of a coaxial cable connected to a terminal provided on a circuit board, and a connection structure of a terminal of this coaxial cable.

2. Description of the Related Art

Recently, coaxial cables have been used, for example, in information communication devices and medical devices to transmit communication signals. As shown in FIG. 3, a coaxial cable 110 of this type comprises an internal conductor 111, an internal insulating layer 113 which is provided on the outer peripheral surface of the internal conductor 111 and which covers the internal conductor 111, an external conductor 115 which is provided on the outer peripheral surface of the internal insulating layer 113 and which covers the internal insulating layer 113, and an external insulating layer 117 which is provided on the outer peripheral surface of the external conductor 115 and which covers the external conductor 115. The internal conductor 111 is a conductor which transfers communication signals. The internal insulating layer 113 is a dielectric. The external conductor 115 is a conductor which prevents the generation of, for example, electromagnetic noise. The external insulating layer 117 is a dielectric.

A terminal of the coaxial cable 110 is connected to terminals 123 and 125 provided on a circuit board 121. Therefore, in a structure (hereinafter, a terminal structure 131) of the terminal of the coaxial cable 110, the internal insulating layer 113, the external conductor 115, and the external insulating layer 117 are removed so that the internal conductor 111, the internal insulating layer 113, and the external conductor 115 are exposed in order from side of an end face 110b and the terminal is stepped. The internal conductor 111 is connected to one terminal 123 by unshown solder, and the external conductor 115 is connected to the other terminal 125 by unshown solder.

However, as shown in FIG. 3, the outside diameter of the internal conductor 111 is different from the outside diameter of the external conductor 115 covering the internal conductor 111 via the internal insulating layer 113. Thus, the internal conductor 111 and the external conductor 115 are not easily connected to the respective terminals 123 and 125 provided on the flat circuit board 121 because of the difference of their outer shapes. This may lead to unstable connection.

In response to the size reduction of the circuit board 121, a size reduction (space saving) has recently been required for a connection portion between the internal conductor 111 and terminal 123 and a connection portion between the external conductor 115 and terminal 125. Accordingly, the length of the terminal of the coaxial cable 110 including the exposed portions tends to be short. However, if the length of the terminal is short, a sufficient connection area may not be ensured.

Thus, for example, according to Jpn. Pat. Appln. KOKAI Publication No. 2008-257936, in order to compensate for the difference of outer shape between an internal conductor and an external conductor, a step corresponding to the difference is formed in a circuit board, and a terminal is provided to adapt to the step. This ensures stable connection and a sufficient connection area.

In the circuit board according to Jpn. Pat. Appln. KOKAI Publication No. 2008-257936 described above, the step is fabricated, and a space for the fabrication is needed. When the circuit board 121 is flat as shown in FIG. 3, the connection between the internal conductor 111 and terminal 123 and the connection between the external conductor 115 and terminal 125 are not stable, which may not ensure a connection area.

BRIEF SUMMARY OF THE INVENTION

In view of the foregoing problem, an object of the present invention is therefore to provide a terminal structure of a coaxial cable which capable to be connected, stably and in a space-saving manner, to a terminal provided on a flat circuit board and which can ensure a sufficient connection area, and a connection structure of a terminal of the coaxial cable.

According to an aspect of a terminal structure of a coaxial cable according to the present invention, the coaxial cable includes an internal conductor, an internal insulating layer covering an outer peripheral surface of the internal conductor, an external conductor covering an outer peripheral surface of the internal insulating layer, and an external insulating layer covering an outer peripheral surface of the external conductor, the terminal structure includes an internal conductor connection portion having a conducting portion which is provided on an end face of the coaxial cable and which conducts the internal conductor and the external conductor to each other, the internal conductor connection portion being formed in the outer peripheral surface of the external conductor exposed from the external insulating layer on the side of the end face, the internal conductor connection portion being connected to the internal conductor via the conducting portion and the external conductor; a removal portion provided at the rear side relative to the internal conductor connection portion, the removal portion being formed by circumferentially removing a part of the external conductor exposed from the external insulating layer; and an external conductor connection portion provided at the rear side relative to the removal portion, the external conductor connection portion being formed in the outer peripheral surface of the external conductor exposed from the external insulating layer, being shut off from the internal conductor connection portion by the removal portion, and being connected to the external conductor.

According to an aspect of a connection structure of a terminal of a coaxial cable according to the present invention, the coaxial cable includes an internal conductor, an internal insulating layer covering an outer peripheral surface of the internal conductor, an external conductor covering an outer peripheral surface of the internal insulating layer, and an external insulating layer covering an outer peripheral surface of the external conductor, the connection structure includes an internal conductor connection portion having a conducting portion which is provided on an end face of the coaxial cable and which conducts the internal conductor and the external conductor to each other, the internal conductor connection portion being formed in the outer peripheral surface of the external conductor exposed from the external insulating layer on the side of the end face, the internal conductor connection portion being connected to the internal conductor via the conducting portion and the external conductor; a removal portion provided at the rear side relative to the internal conductor connection portion, the removal portion being formed by circumferentially removing a part of the external conductor exposed from the external insulating layer; and an external conductor connection portion provided at the rear side relative to the removal portion, the external conductor connection portion being formed in the outer peripheral surface of the external conductor exposed from the external insulating layer, being shut off from the internal conductor connection portion by the removal portion, and being connected to the external conductor, wherein the internal conductor connection portion and the external conductor connection portion are connected to each other on the same plane of a circuit board.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the drawings.

A first embodiment is described with reference to FIG. 1, FIG. 2A, FIG. 2B, FIG. 2C, FIG. 2D, FIG. 2E, FIG. 2F, FIG. 2G, and FIG. 2H.

Figure 1:
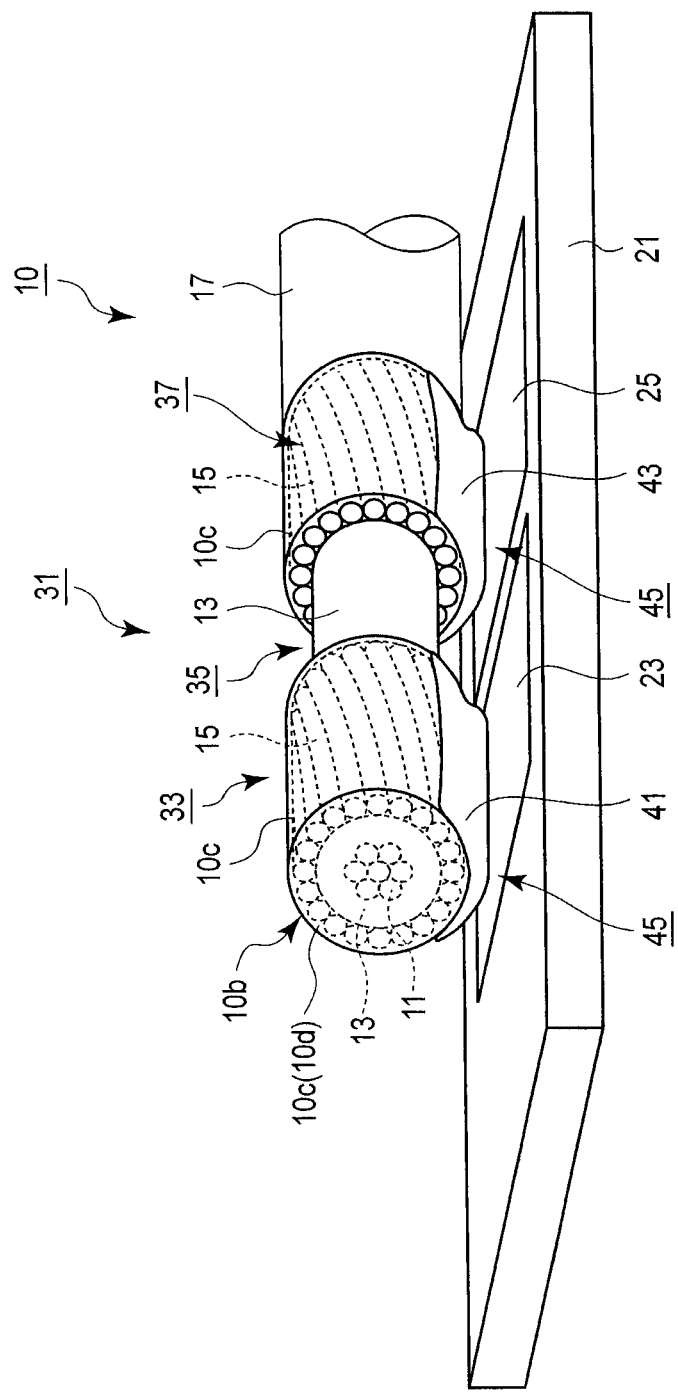
FIG. 1 is a perspective view of a terminal structure of a coaxial cable according to the present invention.
Figure 2A:
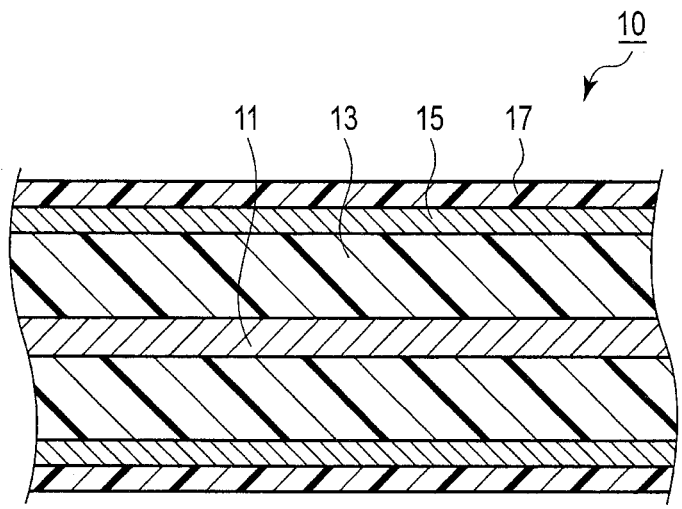
FIG. 2A is a diagram showing the structure of the coaxial cable.

As shown in FIG. 1 and FIG. 2A, a coaxial cable 10 comprises an internal conductor 11, an internal insulating layer 13 which is provided on the outer peripheral surface of the internal conductor 11 and which covers the internal conductor 11, an external conductor 15 which is provided on the outer peripheral surface of the internal insulating layer 13 and which covers the internal insulating layer 13, and an external insulating layer 17 which is provided on the outer peripheral surface of the external conductor 15 and which covers the external conductor 15. The internal conductor 11, the internal insulating layer 13, the external conductor 15, and the external insulating layer 17 are concentrically provided.

As shown in FIG. 1, the internal conductor 11 is formed by a plurality of metal wires. More specifically, the internal conductor 11 is, for example, a stranded wire twined from copper alloy wires. The internal conductor 11 is a core wire of the coaxial cable 10. This internal conductor 11 is a conductor which transfers communication signals. As shown in FIG. 1, the internal conductor 11 is connected to, for example, one terminal 23 provided on a flat circuit board 21 by solder 41 which is one connection member.

The internal insulating layer 13 insulates the internal conductor 11 and the external conductor 15 from each other. The internal insulating layer 13 is a tubular body covering the internal conductor 11, and is a dielectric.

The external conductor 15 is a conductor which prevents the generation of, for example, electromagnetic noise, and is a barrier layer. As shown in FIG. 1, the external conductor 15 is formed by a plurality of metal wires to prevent the generation of, for example, electromagnetic noise. More specifically, the external conductor 15 is, for example, a wire bundle formed by a plurality of spirally braided tin-plated copper alloy wires. As shown in FIG. 1, the external conductor 15 is connected to, for example, the other terminal 25 provided on the flat circuit board 21 by solder 43 which is the other connection member.

The external insulating layer 17 insulates the external conductor 15 and the circuit board 21 from each other. The external insulating layer 17 is a sheath tube covering the external conductor 15.

The internal insulating layer 13 and the external insulating layer 17 are, for example, flexible and expandable, and are formed by, for example, a highly chemical-resistant and heat-resistant fluorocarbon resin.

As shown in FIG. 1 and as described above, a terminal of this coaxial cable 10 is connected to, for example, one terminal 23 and the other terminal 25 provided on the flat circuit board 21 by solders 41 and 43.

Now, a structure (hereinafter, a terminal structure 31) of the terminal of the coaxial cable 10 is described with reference to FIG. 1, FIG. 2B, FIG. 2C, FIG. 2D, FIG. 2E, FIG. 2F, and FIG. 2G.

Figure 2B:
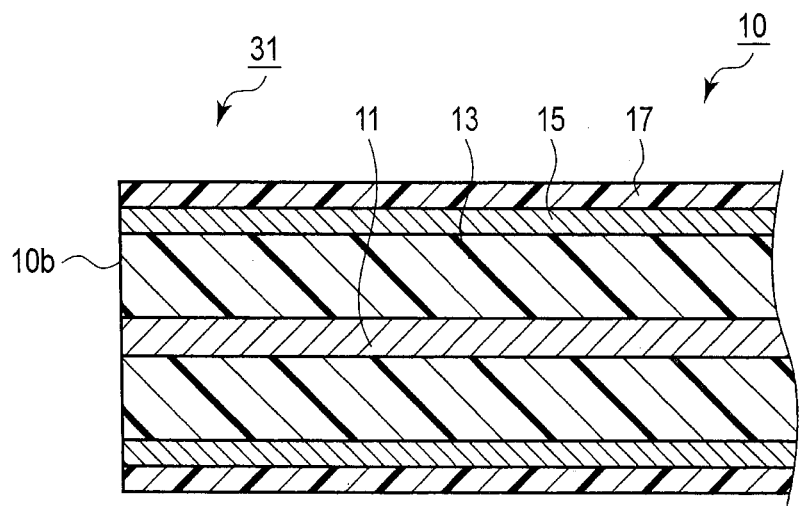
FIG. 2B is a diagram showing the structure of the coaxial cable on the side of an end face, and is a diagram illustrating a method of manufacturing the terminal structure.

As shown in FIG. 2B, in the terminal structure 31, the terminal of this coaxial cable 10 has a planar end face 10b which is formed by cutting the coaxial cable 10 in a direction perpendicular to a axial direction of the coaxial cable 10, and provided along this perpendicular direction.

Figure 2C:
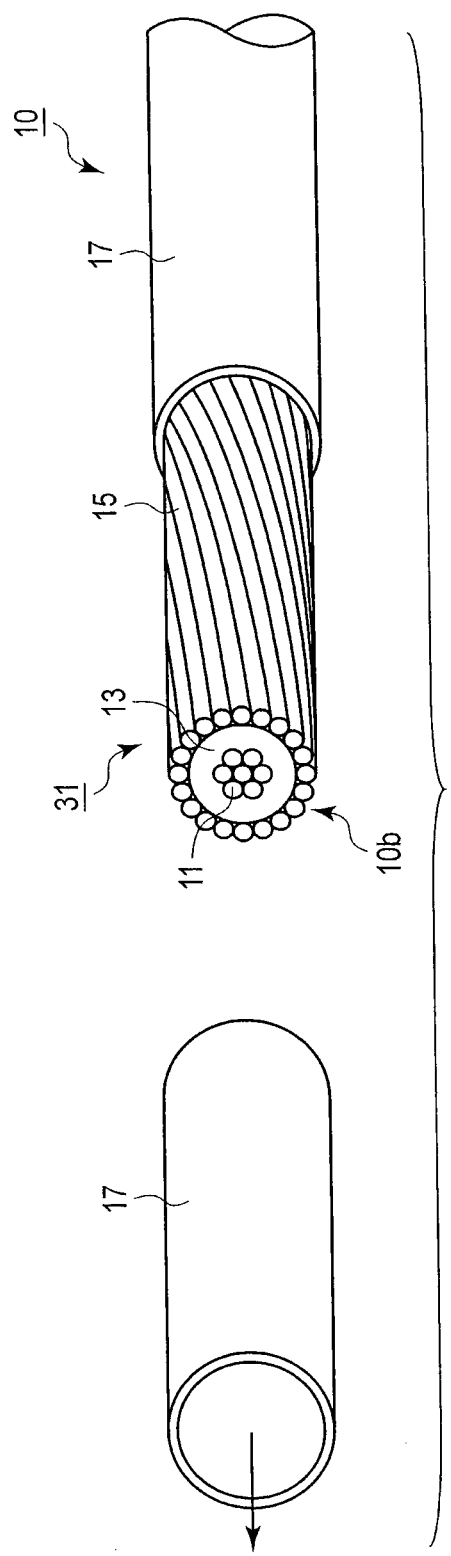
FIG. 2C is a perspective view of the terminal structure with an external insulating layer removed, and is a diagram illustrating the method of manufacturing the terminal structure.

As shown in FIG. 2C, in the terminal structure 31, a terminal of the external insulating layer 17 is removed, and the outer peripheral surface of the external conductor 15 is exposed from the external insulating layer 17. The length of the exposure is, for example, the length from one terminal 23 to the other terminal 25 in the axial direction of the coaxial cable 10. Here, in the end face 10b, the internal conductor 11, the internal insulating layer 13, and the external conductor 15 are concentrically provided.

Figure 2D:
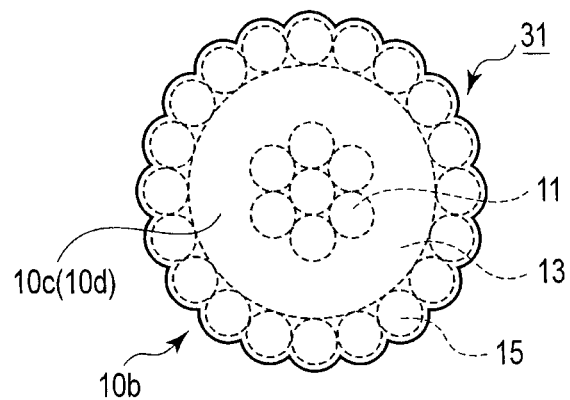
FIG. 2D is a front view of the end face in which a copper plating layer is coated, and is a diagram illustrating the method of manufacturing the terminal structure.

As shown in FIG. 2D, a copper plating layer 10c is coated in at least the entire surface of the end face 10b. In the end face 10b, the copper plating layer 10c bonds the internal conductor 11, the internal insulating layer 13, and the external conductor 15 on the side of the end face 10b to one another. In the end face 10b, the copper plating layer 10c also conducts (electrically connects) the internal conductor 11 and the external conductor 15 on the side of the end face 10b to each other. Thus, the copper plating layer 10c in the end face 10b functions as a conducting portion 10d which conducts the internal conductor 11 and the external conductor 15 on the side of the end face 10b to each other.

Figure 2E:
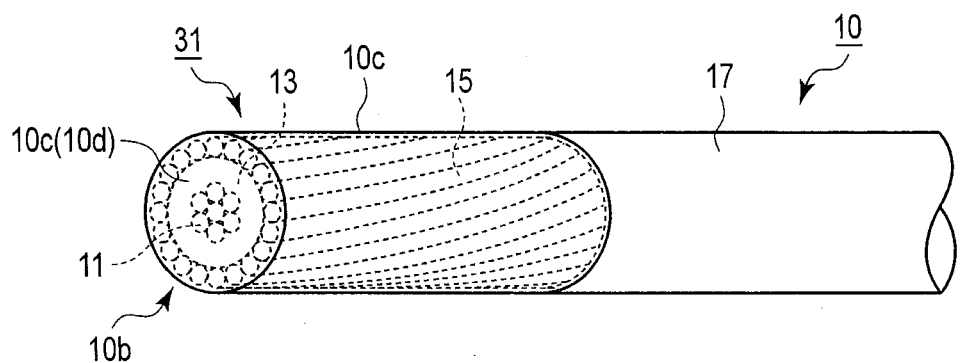
FIG. 2E is a perspective view of the terminal structure having the copper plating layer coated in the end face and in the outer peripheral surface of an external conductor, and is a diagram illustrating the method of manufacturing the terminal structure.
Figure 2F:
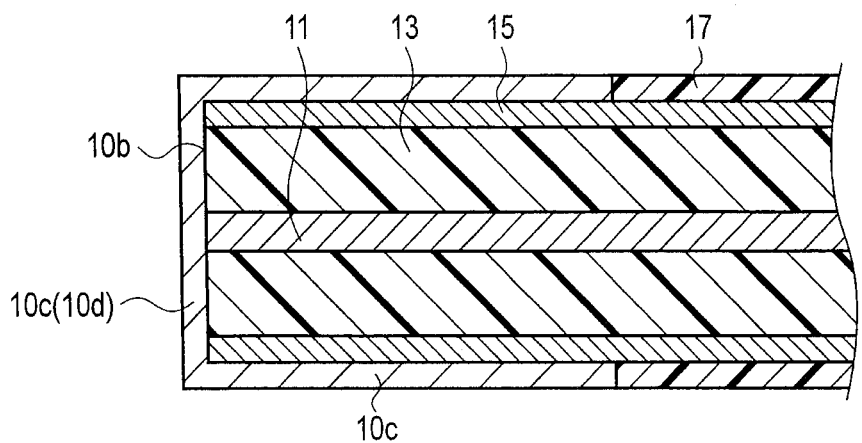
FIG. 2F is an axial sectional view of the terminal structure shown in FIG. 2E in the axial direction of the coaxial cable, and is a diagram illustrating the method of manufacturing the terminal structure.

As shown in FIG. 2E and FIG. 2F, the copper plating layer 10c is preferably also coated in the outer peripheral surface of the external conductor 15 in the vicinity of the end face 10b in order to efficiently conduct the internal conductor 11 and the external conductor 15 on the side of the end face 10b to each other. As shown in FIG. 2E and FIG. 2F, the copper plating layer 10c may be coated in the entire outer peripheral surface of the external conductor 15 in order to prevent the external conductor 15 from breaking apart. In this case, the tin-plated copper alloy wires (external conductor 15) are bonded to each other by the copper plating layer 10c.

As shown in FIG. 1, the terminal structure 31 of the coaxial cable 10 comprises, in order from the side of the end face 10b (front side) in the axial direction of the coaxial cable 10, an internal conductor connection portion 33 which connects the internal conductor 11 to one terminal 23 via the external conductor 15 and the conducting portion 10d, a removal portion 35 which is adjacent to the internal conductor connection portion 33 and which is formed by the removal of the external conductor 15, and an external conductor connection portion 37 which is adjacent to the removal portion 35 and which connects the external conductor 15 to the other terminal 25. The internal conductor connection portion 33, the removal portion 35, and the external conductor connection portion 37 are exposed from the external insulating layer 17.

The internal conductor connection portion 33 has the conducting portion 10d (conducting portion 10d) provided on the end face 10b. In the external conductor 15 in which the terminal side of the external insulating layer 17 is removed and which is exposed from the external insulating layer 17 and in which the copper plating layer 10c is coated, the internal conductor connection portion 33 is formed in the outer peripheral surface of the external conductor 15 on the side of the end face 10b. Thus, the internal conductor connection portion 33 is connected to the internal conductor 11 via the external conductor 15 and the conducting portion 10d. The internal conductor connection portion 33 thereby electrically connects the internal conductor 11 and one terminal 23.

The internal conductor connection portion 33 is formed in the entire outer peripheral surface of the external conductor 15 on the side of the end face 10b (front side) relative to the removal portion 35 in the axial direction of the coaxial cable 10. In other words, the internal conductor connection portion 33 is formed in the entire outer peripheral surface of the external conductor 15 between the removal portion 35 and the end face 10b in the axial direction of the coaxial cable 10. That is, the entire outer peripheral surface of the external conductor 15 provided in front of the removal portion 35 and exposed from the external insulating layer 17 functions as the internal conductor connection portion 33. The internal conductor connection portion 33 is formed symmetrically to the external conductor connection portion 37 with respect to the removal portion 35 in the axial direction of the coaxial cable 10.

In the internal conductor connection portion 33, the internal conductor 11 is electrically connected to one terminal 23 via the conducting portion 10d and the external conductor 15, and transfers an electric signal to one terminal 23 via the conducting portion 10d and the external conductor 15.

Since the outer peripheral surface of the external conductor 15 is exposed from the external insulating layer 17 as described above, the terminal structure 31 has a three-layer structure formed by the internal conductor 11, the internal insulating layer 13, and the external conductor 15 in the internal conductor connection portion 33. Here, in the internal conductor connection portion 33, the internal conductor 11, the internal insulating layer 13, and the external conductor 15 are concentrically provided.

The above-mentioned copper plating layer 10c serving as a conductive layer is formed on the outer periphery of the external conductor 15 on which the internal conductor connection portion 33 is provided.

In the external conductor 15 exposed from the external insulating layer 17, the removal portion 35 is formed by circumferentially removing a part of the external conductor 15 exposed from the external insulating layer 17 so that the external conductor 15 is separated into the front and rear parts in the axial direction of the coaxial cable 10 and so that the internal insulating layer 13 is circumferentially exposed. The removal portion 35 is formed on the side of the external insulating layer 17 (rear side) relative to the internal conductor connection portion 33 in the axial direction of the coaxial cable 10 and formed adjacent to the internal conductor connection portion 33 and the external conductor connection portion 37.

The external conductor 15 on the side of the end face 10b (front side) and the external conductor 15 on the side of the external insulating layer 17 (rear side) are separated from each other with respect to the removal portion 35. Thus, the removal portion 35 is also a separating portion which separates the external conductor 15 into the front and rear parts. The above-mentioned internal conductor connection portion 33 is formed in the external conductor 15 on the side of the end face 10b, and the above-mentioned external conductor connection portion 37 is formed in the external conductor 15 on the side of the external insulating layer 17. That is, the internal conductor connection portion 33 is formed in the entire outer peripheral surface of the external conductor 15 on the side of the end face 10b (front side) in the external conductor 15 separated by the removal portion 35. In other words, the entire outer peripheral surface of the external conductor 15 provided in front of the removal portion 35 and exposed from the external insulating layer 17 functions as the internal conductor connection portion 33. The external conductor connection portion 37 is formed in the entire outer peripheral surface of the external conductor 15 on the side of the external insulating layer 17 (rear side) in the external conductor 15 which is separated by the removal portion 35. In other words, the entire outer peripheral surface of the external conductor 15 provided in the rear of the removal portion 35 and exposed from the external insulating layer 17 functions as the external conductor connection portion 37. This removal portion 35 is adjacent to the external conductor 15 on the side of the end face 10b and the external conductor 15 on the side of the external insulating layer 17 in the axial direction of the coaxial cable 10, and is formed therebetween.

In the removal portion 35, the external conductor 15 is circumferentially removed, and the internal insulating layer 13 is circumferentially exposed. Therefore, the tin-plated copper alloy wires (external conductor 15) are cut by the removal portion 35 into the side of the end face 10b and the side of the external insulating layer 17 in the axial direction of the coaxial cable 10. The external conductor 15 (internal conductor connection portion 33) on the side of the end face 10b is electrically shut off from the external conductor 15 (external conductor connection portion 37) on the side of the external insulating layer 17. In the external conductor 15 on the side of the end face 10b and the external conductor 15 on the side of the external insulating layer 17 that are separated from each other by the removal portion 35, the external conductor 15 (internal conductor connection portion 33) on the side of the end face 10b and the external conductor 15 (external conductor connection portion 37) on the side of the external insulating layer 17 have the same shape and the same diameter. Thus, the removal portion 35 is an exposure portion which circumferentially exposes the internal insulating layer 13, and is also a shut-off portion which electrically shuts off the front and rear external conductors 15 from each other.

In the removal portion 35, the terminal structure 31 has a two-layer structure formed by the internal conductor 11 and the internal insulating layer 13. In the removal portion 35, the internal conductor 11 and the internal insulating layer 13 are concentrically provided.

The external conductor connection portion 37 is formed in the entire outer peripheral surface of the external conductor 15 which is provided on the side of the external insulating layer 17 (rear side) relative to the removal portion 35 in the axial direction of the coaxial cable 10 and which is exposed from the external insulating layer 17 and in which the copper plating layer 10c is coated. The external conductor connection portion 37 is shut off from the internal conductor connection portion 33 by the removal portion 35. The external conductor connection portion 37 is connected to the external conductor 15, and thereby electrically connects the external conductor 15 and the other terminal 25.

The external conductor connection portion 37 is formed in the entire outer peripheral surface of the external conductor 15 on the side of the external insulating layer 17 (rear side) relative to the removal portion 35 in the axial direction of the coaxial cable 10. In other words, the external conductor connection portion 37 is formed in the entire outer peripheral surface of the external conductor 15 between the removal portion 35 and the external insulating layer 17 in the axial direction of the coaxial cable 10. That is, the entire outer peripheral surface of the external conductor 15 provided at the rear of the removal portion 35 and exposed from the external insulating layer 17 functions as the external conductor connection portion 37.

Since the outer peripheral surface of the external conductor 15 is exposed from the external insulating layer 17 as described above, the terminal structure 31 has a three-layer structure formed by the internal conductor 11, the internal insulating layer 13, and the external conductor 15 in the external conductor connection portion 37. Here, in the external conductor connection portion 37, the internal conductor 11, the internal insulating layer 13, and the external conductor 15 are concentrically provided.

The above-mentioned copper plating layer 10c serving as a conductive layer is formed on the outer periphery of the external conductor 15 which functions as the external conductor connection portion 37.

In a connection structure 45 of the terminal structure 31 and terminals 23 and 25 according to the present embodiment, the internal conductor connection portion 33 and the external conductor connection portion 37 are connected on the same plane of the circuit board 21, as shown in FIG. 1. The connection structure 45 comprises one bonding member, for example, solder 41 which bonds the internal conductor connection portion 33 and terminal 23 to connect the internal conductor 11 and terminal 23, and the other bonding member, for example, solder 43 which bonds the external conductor connection portion 37 and terminal 25 to connect the external conductor 15 and terminal 25. Solder 41 is provided, for example, in and around a contact surface between the internal conductor connection portion 33 and terminal 23. Solder 43 is provided, for example, in and around a contact surface between the external conductor connection portion 37 and terminal 25.

Now, a method of manufacturing the coaxial cable 10 according to the present embodiment is described.

As shown in FIG. 2A, the internal insulating layer 13 is provided on the outer peripheral surface of the internal conductor 11 to cover the internal conductor 11, the external conductor 15 is provided on the outer peripheral surface of the internal insulating layer 13 to cover the internal insulating layer 13, and the external insulating layer 17 is provided on the outer peripheral surface of the external conductor 15 to cover the external conductor 15, so that the internal conductor 11, the internal insulating layer 13, the external conductor 15, and the external insulating layer 17 are concentrically provided. The coaxial cable 10 is manufactured in this way.

Now, a method of manufacturing the terminal structure 31 of the coaxial cable 10 according to the present embodiment is described.

As shown in FIG. 2B, the coaxial cable 10 is cut in the direction perpendicular to the axial direction of the coaxial cable 10 by a cutting member such as a knife. This cut surface is formed as the planar end face 10b formed in the direction perpendicular to the axial direction of the coaxial cable 10. In the planar end face 10b, the internal conductor 11, the internal insulating layer 13, the external conductor 15, and the external insulating layer 17 are exposed to be concentrically provided.

As shown in FIG. 2C, the part of the external insulating layer 17 located at a desired distance from the end face 10b is circumferentially cut out by a cutting member such as a knife. The external insulating layer 17 up to the part located at a desired distance from the end face 10b is pulled out (torn off) toward side of the end face 10b, and removed from the terminal structure 31. As a result, the external conductor 15 is exposed in the terminal structure 31. The length of the exposure, that is, the length of the removal of the external insulating layer 17 is, for example, the length from one terminal 23 to the other terminal 25 in the axial direction of the coaxial cable 10.

As shown in FIG. 2D, FIG. 2E, and FIG. 2F, in the terminal structure 31, the entire end face 10b and the outer peripheral surface of the external conductor 15 that is exposed from the external insulating layer 17 are immersed in a copper plating solution and coated with the copper plating layer 10c. As a result, in the end face 10b, the internal conductor 11, the internal insulating layer 13, and the external conductor 15 are bonded to one another by the copper plating layer 10c, and the internal conductor 11 and the external conductor 15 are conducted (electrically connected) to each other by the copper plating layer 10c which is the conducting portion 10d. At the same time, the external conductor 15 is coated with the copper plating layer 10c. The metal wires forming the external conductor 15 are then bonded to one another by the copper plating layer 10c, and prevented from breaking apart.

Figure 2G:
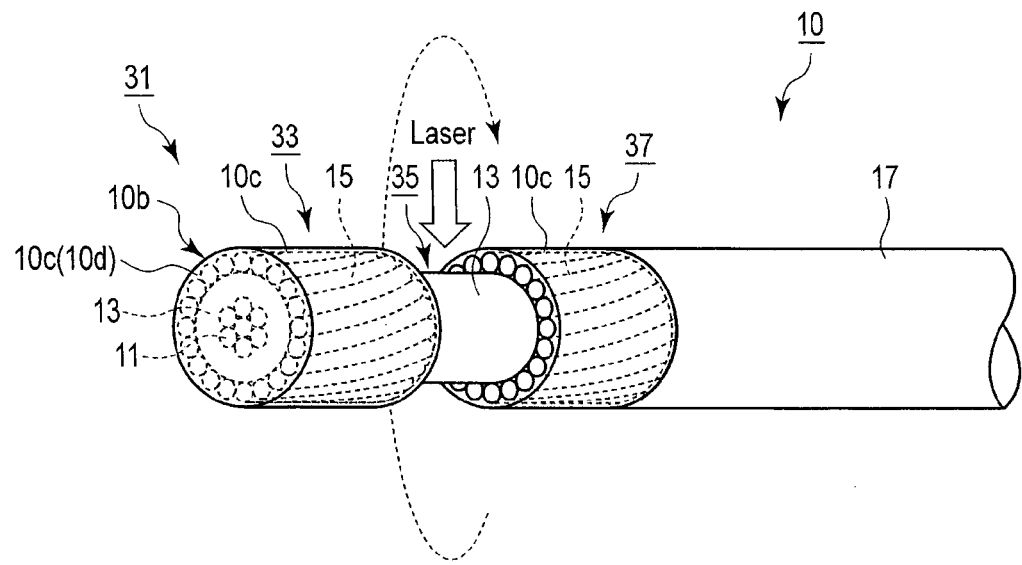
FIG. 2G is a perspective view of the terminal structure with a removal portion formed therein, and is a diagram illustrating the method of manufacturing the terminal structure.
Figure 2H:
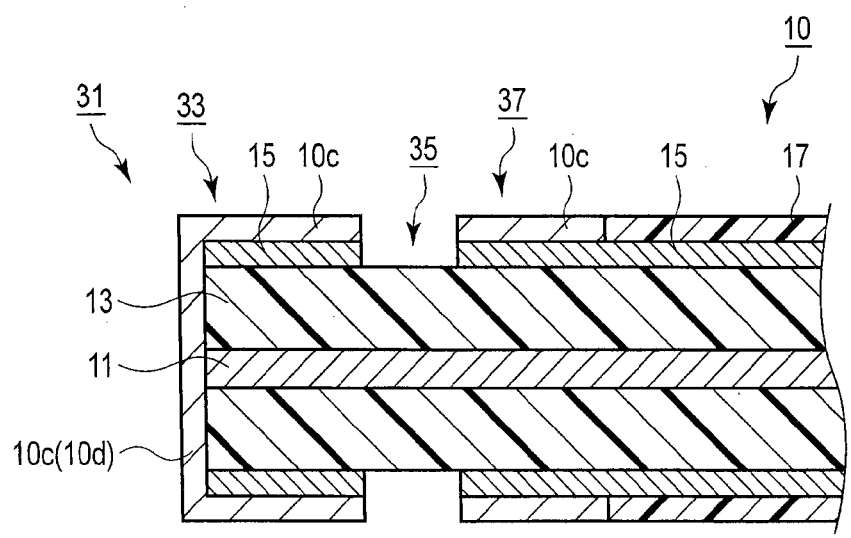
FIG. 2H is an axial sectional view of the terminal structure shown in FIG. 2G in the axial direction of the coaxial cable, and is a diagram illustrating the method of manufacturing the terminal structure.
Figure 3:
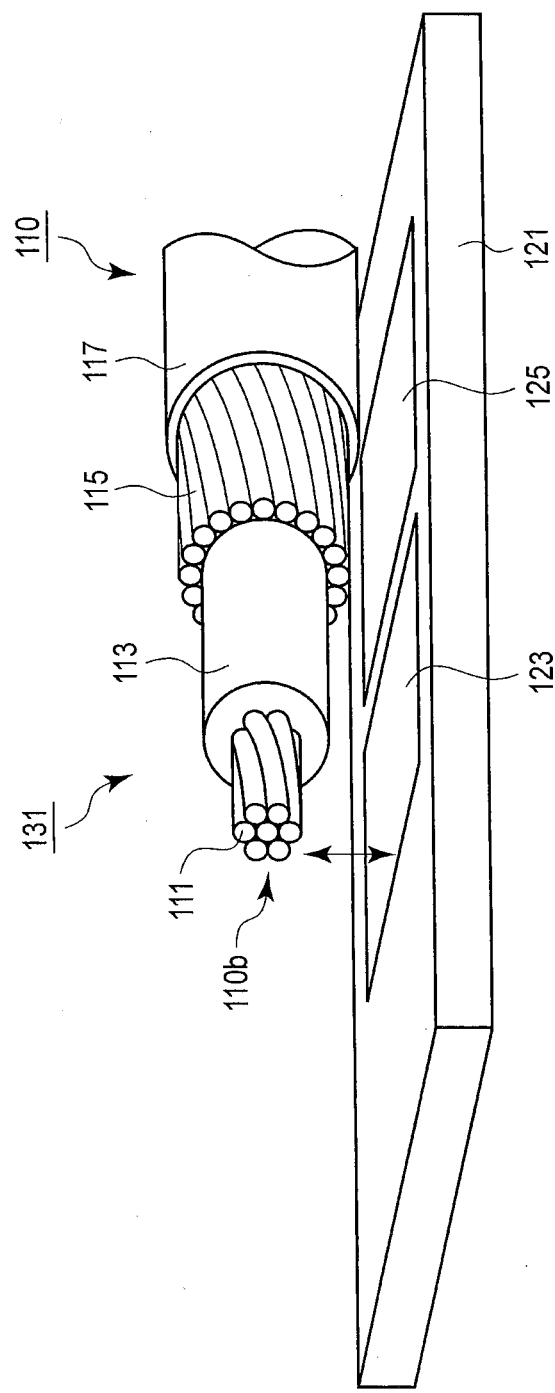
FIG. 3 is a perspective view of a terminal structure of a general coaxial cable.

As shown in FIG. 2G and FIG. 2H, in the external conductor 15 exposed from the external insulating layer 17, a part of the external conductor 15 is circumferentially removed so that the external conductor 15 is separated into the front and rear parts in the axial direction of the coaxial cable 10 and so that the internal insulating layer 13 is circumferentially exposed. For example, an unshown shield strip device is used for the removal. The shield strip device applies, for example, laser to the part of the external conductor 15 exposed from the external insulating layer 17 to remove this part. This laser has a degree of output that lightly affects the internal insulating layer 13 and that cuts the copper plating layer 10c and the tin-plated copper alloy wires (external conductor 15). The irradiation width of the laser is the length of a part of the external conductor 15 in the axial direction of the coaxial cable 10, that is, the length of the removal portion 35. This irradiation width is adjusted by the shield strip device so that the internal conductor connection portion 33 is formed to correspond to the location and size of one terminal 23 in the circuit board 21 and is thereby connected to one terminal 23 and so that the external conductor connection portion 37 is formed to correspond to the location and size of the other terminal 25 in the circuit board 21 and is thereby connected to the other terminal 25. Simultaneously with the application of the laser by the shield strip device, the terminal structure 31 circumferentially rotates in the axial direction of the coaxial cable 10 so that the laser is applied to the circumference of a part of the external conductor 15. The shield strip device may rotate along the circumferential direction.

Thus, a part of the external conductor 15 is circumferentially removed. In this part, the internal insulating layer 13 is exposed without being affected by the laser, and the removal portion 35 is formed. The tin-plated copper alloy wires (external conductor 15) are cut into the side of the end face 10b (front side) and the side of the external insulating layer 17 (rear side) in the axial direction of the coaxial cable 10 by the removal portion 35.

In the external conductor 15 separated by the removal portion 35, the entire outer peripheral surface of the external conductor 15 of the side of the end face 10b (front side) is formed (functions) as the internal conductor connection portion 33, and the entire outer peripheral surface of the external conductor 15 of the side of the external insulating layer 17 (rear side) is formed (functions) as the external conductor connection portion 37. The internal conductor connection portion 33 and the external conductor connection portion 37 are electrically shut off by the removal portion 35.

The internal conductor connection portion 33 is formed to correspond to the position and size of one terminal 23 provided on the circuit board 21 so that the internal conductor connection portion 33 is connected to one terminal 23. The external conductor connection portion 37 is formed to correspond to the position and size of the other terminal 25 provided on the circuit board 21 so that the external conductor connection portion 37 is connected to the other terminal 25.

The external conductor connection portion 37 (the external conductor 15 on the side of the external insulating layer 17) and the internal conductor connection portion 33 (the external conductor 15 on the side of the end face 10b) have the same shape and the same diameter.

Now, how to connect the terminal structure 31 of the coaxial cable 10 to terminals 23 and 25 by the connection structure 45 according to the present embodiment is described.

The terminal structure 31 is provided on the circuit board 21, and the external conductor 15 functioning as the internal conductor connection portion 33 directly contacts one terminal 23. The external conductor 15 functioning as the external conductor connection portion 37 directly contacts the other terminal 25. The external conductor 15 functioning as the internal conductor connection portion 33 and the external conductor 15 functioning as the external conductor connection portion 37 have the same diameter as shown in FIG. 2H, and therefore simultaneously contact terminals 23 and 25. In this case, as the external conductor 15 functioning as the internal conductor connection portion 33 and the external conductor 15 functioning as the external conductor connection portion 37 have the same diameter, the terminal structure 31 stably contacts the terminals without wobbling on the same plane of the circuit board 21.

The internal conductor connection portion 33 is formed by the removal portion 35 to correspond to the position and size of one terminal 23 provided on the circuit board 21. The external conductor connection portion 37 is formed by the removal portion 35 to correspond to the position and size of the other terminal 25 provided on the circuit board 21. Therefore, the terminal structure 31 contacts terminals 23 and 25 in a space-saving manner.

The external conductor 15 functioning as the internal conductor connection portion 33 is electrically shut off from the external conductor 15 functioning as the external conductor connection portion 37 by the removal portion 35. The external conductor 15 functioning as the internal conductor connection portion 33 is only conducted in the internal conductor 11 by the conducting portion 10d. As the external conductor 15 functioning as the internal conductor connection portion 33 covers the internal conductor 11 via the internal insulating layer 13, the area of the outer periphery of the external conductor 15 is larger than the area of the outer periphery of the internal conductor 11. Thus, as compared with the direct contact of the internal conductor 11 with one terminal 23, the contact of the internal conductor 11 with one terminal 23 via the conducting portion 10d and the external conductor 15 in the present embodiment ensures a sufficient surface to contact one terminal 23 in the terminal structure 31 according to the present embodiment.

As shown in FIG. 1, in the connection structure 45, solder 41 is provided in and around the contact surface between the internal conductor connection portion 33 and terminal 23. Solder 43 is provided, for example, in and around the contact surface between the external conductor connection portion 37 and terminal 25. Thus, the internal conductor connection portion 33 is bonded to one terminal 23, for example, by solder 41, and the external conductor connection portion 37 is bonded to the other terminal 25, for example, by solder 43. The connection structure 45 then connects the terminal structure 31 of the coaxial cable 10 to terminals 23 and 25 on the same plane of the circuit board 21.

As described above, according to the present embodiment, the external insulating layer 17 is removed, the external conductor 15 is exposed, and the internal conductor 11 is conducted to the external conductor 15 by the conducting portion 10d in the end face 10b. Moreover, according to the present embodiment, the external conductor 15 is cut into the side of the end face 10b (front side) and the side of the external insulating layer 17 (rear side) in the axial direction of the coaxial cable 10 by the removal portion 35, and the internal conductor connection portion 33 and the external conductor connection portion 37 having the same diameter are formed.

Consequently, according to the present embodiment, the terminal structure 31 can be simultaneously connected to one terminal 23 and the other terminal 25 provided on the flat circuit board 21, and the terminal structure 31 can be stably connected to terminals 23 and 25 without wobbling.

According to the present embodiment, the removal portion 35 allows the internal conductor connection portion 33 to be formed to correspond to the position and size of one terminal 23 provided on the circuit board 21, and allows the external conductor connection portion 37 to be formed to correspond to the position and size of the other terminal 25 provided on the circuit board 21. Therefore, according to the present embodiment, the terminal structure 31 can be connected to terminals 23 and 25 in a space-saving manner.

According to the present embodiment, the external conductor 15 functioning as the internal conductor connection portion 33 can be electrically shut off from the external conductor 15 functioning as the external conductor connection portion 37 by the removal portion 35. According to the present embodiment, the internal conductor 11 can be conducted to the external conductor 15 by the conducting portion 10d in the internal conductor connection portion 33. According to the present embodiment, in the internal conductor connection portion 33, the internal conductor 11 is covered by the external conductor 15, so that the contact surface can be larger when the outer peripheral surface of the external conductor 15 contacts one terminal 23 than when the outer peripheral surface of the internal conductor 11 contacts terminal 23. Thus, according to the present embodiment, as compared with the direct contact of the internal conductor 11 with one terminal 23, the contact of the internal conductor 11 with one terminal 23 via the conducting portion 10d and the external conductor 15 can ensure a sufficient area to contact one terminal 23 in the terminal structure 31. According to the present embodiment, the area of contact of the internal conductor 11 with one terminal 23 via the external conductor 15 can be larger than the area of direct contact of the internal conductor 11 with one terminal 23, so that the contact with one terminal 23 in the terminal structure 31 can be more stable. According to the present embodiment, the internal conductor connection portion 33 and the external conductor connection portion 37 have the same diameter, so that a sufficient area to contact the other terminal 25 in the terminal structure 31 can be ensured.

According to the present embodiment, the internal conductor connection portion 33 is formed in the entire outer peripheral surface of the external conductor 15 on the side of the end face 10b (front side) relative to the removal portion 35, and the external conductor connection portion 37 is formed in the entire outer peripheral surface of the external conductor 15 on the side of the external insulating layer 17 (rear side) relative to the removal portion 35. Thus, according to the present embodiment, the terminal structure 31 can be easily connected to terminals 23 and 25 without circumferential alignment.

According to the present embodiment, the outer peripheral surface of the external conductor 15 is immersed in the copper plating solution, so that the external conductors 15 can be bonded to each other by the copper plating layer 10c, and the external conductor 15 can be prevented from breaking apart. According to the present embodiment, when the entire end face 10b is immersed in the copper plating solution to form the conducting portion 10d, the outer peripheral surface of the external conductor 15 is immersed in the copper plating solution simultaneously with the entire end face 10b. This allows the reduction of labor in the operation.

According to the present embodiment, as shown in FIG. 1, the connection structure 45 allows the terminal structure 31 to be connected to terminals 23 and 25 provided on the flat circuit board 21 so that the terminal structure 31 can be stably connected on the same plane of the circuit board 21 in a space-saving manner and so that a sufficient connection area is ensured.

According to the present embodiment, while the internal conductor connection portion 33 is in direct contact with terminal 23 and the external conductor connection portion 37 is in direct contact with terminal 25, solders 41 and 43 may be provided around these contact surfaces except for these contact surfaces. Naturally, solders 41 and 43 may be only provided on the contact surface.

Before the internal conductor connection portion 33 contacts terminal 23 and the external conductor connection portion 37 contacts terminal 25, solders 41 and 43 may be previously provided in terminals 23 and 25 or may be previously provided in the internal conductor connection portion 33 and the external conductor connection portion 37.

The present invention is not completely limited to the embodiment described above, and modifications of components can be made at the stage of carrying out the invention without departing from the spirit thereof. Further, various inventions can be made by properly combining the components disclosed in the embodiment described above.

What is claimed is:

1. A terminal structure of a coaxial cable, the coaxial cable comprising,
   an internal conductor,
   an internal insulating layer covering an outer peripheral surface of the internal conductor,
   an external conductor covering an outer peripheral surface of the internal insulating layer, and
   an external insulating layer covering an outer peripheral surface of the external conductor,
   the terminal structure comprising:
   an internal conductor connection portion having a conducting portion which is provided on an end face of the coaxial cable and which conducts the internal conductor and the external conductor to each other, the internal conductor connection portion being formed in the outer peripheral surface of the external conductor exposed from the external insulating layer on the side of the end face, the internal conductor connection portion being connected to the internal conductor via the conducting portion and the external conductor;
   a removal portion provided at the rear side relative to the internal conductor connection portion, the removal portion being formed by circumferentially removing a part of the external conductor exposed from the external insulating layer; and
   an external conductor connection portion provided at the rear side relative to the removal portion, the external conductor connection portion being formed in the outer peripheral surface of the external conductor exposed from the external insulating layer, being shut off from the internal conductor connection portion by the removal portion, and being connected to the external conductor;
the internal conductor connection portion and the external conductor connection portion have the same maximum outer diameter.

2. The terminal structure of the coaxial cable according to claim 1, wherein the internal conductor connection portion comprises a conductive layer formed on the end face and on the outer periphery of the external conductor on a front side relative to the removal portion and the external conductor connection portion comprises the conductive layer formed on the outer periphery of the external conductor on the rear side relative to the removal portion.

3. The terminal structure of the coaxial cable according to claim 1, wherein the external insulating layer having the same maximum outer diameter as the internal and external conductor connection portions.

4. A connection structure of a terminal of a coaxial cable, the coaxial cable comprising,
an internal conductor,
an internal insulating layer covering an outer peripheral surface of the internal conductor,
an external conductor covering an outer peripheral surface of the internal insulating layer, and
an external insulating layer covering an outer peripheral surface of the external conductor,
the connection structure comprising:
an internal conductor connection portion having a conducting portion which is provided on an end face of the coaxial cable and which conducts the internal conductor and the external conductor to each other, the internal conductor connection portion being formed in the outer peripheral surface of the external conductor exposed from the external insulating layer on the side of the end face, the internal conductor connection portion being connected to the internal conductor via the conducting portion and the external conductor;
a removal portion provided at the rear side relative to the internal conductor connection portion, the removal portion being formed by circumferentially removing a part of the external conductor exposed from the external insulating layer; and
an external conductor connection portion provided at the rear side relative to the removal portion, the external conductor connection portion being formed in the outer peripheral surface of the external conductor exposed from the external insulating layer, being shut off from the internal conductor connection portion by the removal portion, and being connected to the external conductor,
wherein the internal conductor connection portion and the external conductor connection portion are connected to each other on the same plane of a circuit board; and
the internal conductor connection portion and the external conductor connection portion have the same maximum outer diameter.

5. The connection structure of a terminal of a coaxial cable according to claim 4, wherein the external insulating layer having the same maximum outer diameter as the internal and external conductor connection portions.

6. A coaxial cable comprising:
a proximal portion and a distal portion, the distal portion having a terminal structure,
an internal conductor disposed in the distal and proximal portions,
an internal insulating layer disposed in the distal and proximal portions for covering an outer peripheral surface of the internal conductor,
an external conductor disposed in the distal and proximal portions for covering an outer peripheral surface of the internal insulating layer,
an external insulating layer for covering portions of an outer peripheral surface of the external conductor other than in the distal portion so as to expose all portions of the external conductor in the distal portion,
an internal conductor connection portion having a conducting portion which is provided on a distal end face of the coaxial cable in the distal portion and which electrically connects the internal conductor and the external conductor to each other, the internal conductor connection portion being formed in the outer peripheral surface of the external conductor exposed from the external insulating layer on a distal-most side of the distal portion, the internal conductor connection portion being electrically connected to the internal conductor via the conducting portion and the external conductor;
a removal portion provided in the distal portion and proximally to the internal conductor connection portion, the removal portion being formed by circumferentially removing a part of the external conductor exposed from the external insulating layer; and
an external conductor connection portion provided in the distal portion and proximally to the removal portion, the external conductor connection portion being formed in the outer peripheral surface of the external conductor exposed from the external insulating layer, the external conductor connection portion being electrically insulated from the internal conductor connection portion by the removal portion, and being electrically connected to the external conductor;
wherein there is no external insulating layer covering the outer peripheral surface of the external conductor on a front side of the external conductor connection portion.

7. The coaxial cable of claim 6, wherein the internal conductor connection portion comprising a conductive layer formed on the end face and on the outer periphery of the external conductor on a front side relative to the removal portion and the external conductor connection portion comprises the conductive layer formed on the outer periphery of the external conductor on the rear side relative to the removal portion.

8. The coaxial cable of claim 7, wherein the conductive layer is integral with the internal conductor connection portion.

9. The coaxial cable of claim 6, wherein the internal conductor connection portion and the external conductor connection portion have the same maximum outer diameter.

10. The coaxial cable according to claim 9, wherein the external insulating layer having the same maximum outer diameter as the internal and external conductor connection portions.

* * * * *